Oct. 11, 1938.    A. MARTINEZ ET AL    2,132,904
SCREEN FOR THREE-DIMENSIONAL PROJECTIONS
Filed March 20, 1936    2 Sheets-Sheet 1
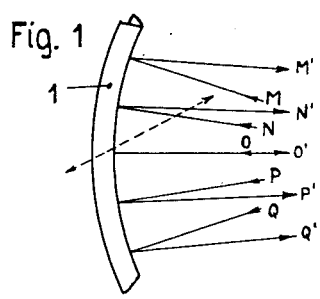
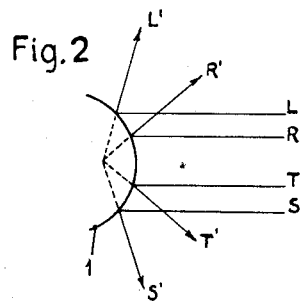
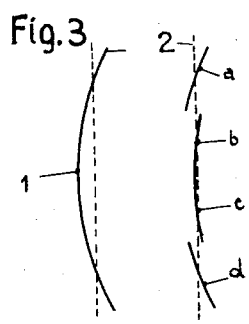
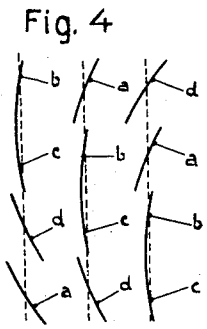
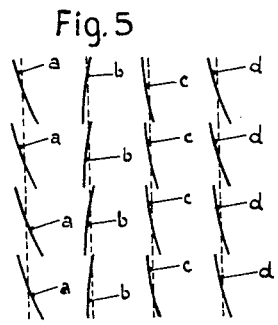
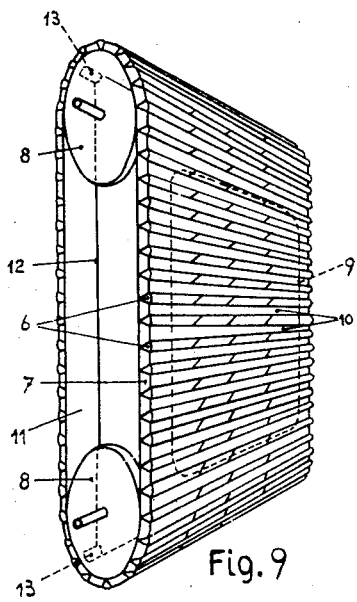
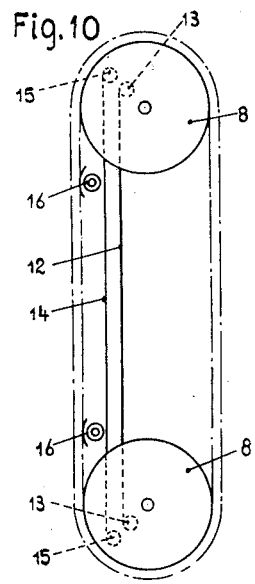
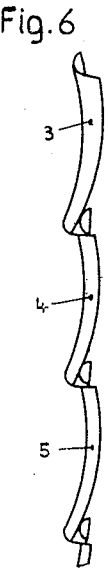
Inventors:
A. Martinez
M. Martinez
A. Martinez
By Glascock Downing & Seebold
Attys.

Oct. 11, 1938.　　A. MARTINEZ ET AL　　2,132,904
SCREEN FOR THREE-DIMENSIONAL PROJECTIONS
Filed March 20, 1936　　2 Sheets-Sheet 2
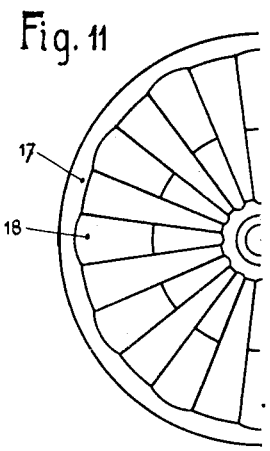
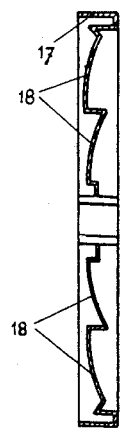
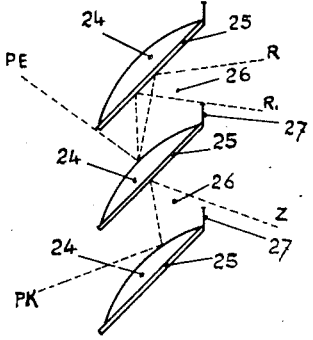
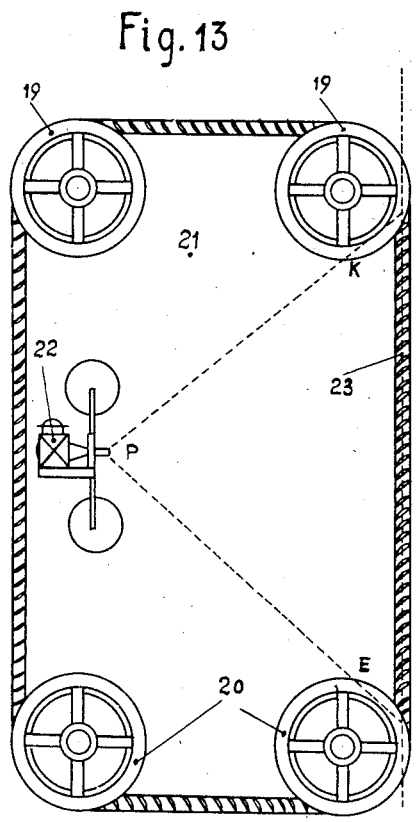
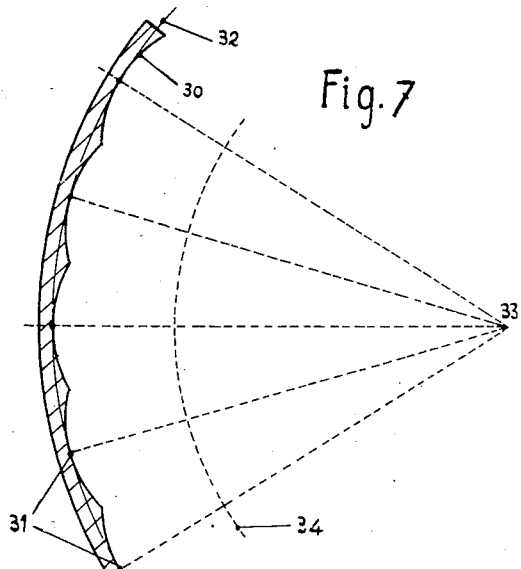
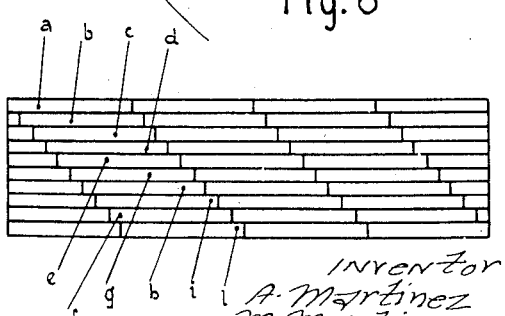

Patented Oct. 11, 1938

2,132,904

UNITED STATES PATENT OFFICE 2,132,904

SCREEN FOR THREE-DIMENSIONAL PROJECTIONS

Arturo Martinez, Matteo Martinez, and Angelo Martinez, Turin, Italy

Application March 20, 1936, Serial No. 69,950
In Italy March 25, 1935

11 Claims. (Cl. 88—24)

It is known that a spherical mirror in superposition of a plurality of images projected onto said mirror from a stereoscopic chamber gives for one observer an actually stereoscopic image. It may be stated that the object of this invention is to utilize this phenomenon for stereoscopic kinematography to afford to all spectators situated in any desired point of a large room a wide field of vision of three-dimensional projections enabling them to move about without losing continuousness or regularity of vision.

With this object in view, this invention employs a moving screen composed of curved specular elements, arranged in rows transversely to the direction of motion of the screen. The specular surface of each element has on its two main axes two different radii of curvature and the screen is moved at high speed in the direction in which the specular surfaces are curved according to a small radius of curvature; the specular surfaces of two succeeding rows are arranged with different inclinations or staggered to each other transversely of the direction of motion so that only some rows of said elements are again parallel or aligned to each other, respectively.

The result of said special form of the specular surfaces is that a circular light beam falling onto the specular surface is transformed thereby into an elongated or strip-shaped reflection, i. e. into a linear reflection. As the screen is moved at high speed in the direction in which the specular elements are curved according to a small radius of curvature, the said strip-shaped reflections are transformed in the eye by effect of the inertia of the retinae into light bands which extend over the whole length on which the specular elements move. Continuoueness of said reflection bands in a direction transversely to the direction of motion is obtained by means of the above mentioned angular or lateral staggering of the specular elements of two adjacent rows.

The reflecting surfaces composing the screen have a basic toric, concave or convex formation and/or they may derive from other forms of curved surfaces with a circular directrix and a suitable generatrix, namely adapted to generate elongated strip-shaped specular reflections. Such surfaces are e. g. paraboloidal, cycloidal, hyperboloidal, ellipsoidal, ovoidal or similar surfaces, either simple or mixed.

The accompanying drawings show by way of example some screen constructions according to this invention.

Figure 1 is a perspective view of a primitive element;

Figure 2 is a cross section thereof;

Figures 3, 4 and 5 show how the actual reflective element may be obtained from the primitive one;

Figure 6 is an enlarged detail view of a reflecting element obtained according to Figures 3 to 5;

Figure 7 is a partial section of a reflecting panel;

Figure 8 is a plan view on a smaller scale of the panel;

Figure 9 is a perspective view of a screen formed by reflecting elements according to this invention; Figure 10 is a side view of the screen equipped for chromatic infrascopy; Figures 11 and 12 are an elevation and a cross sectional view, respectively, of a disc screen and Figures 13 and 14 show a screen for transcopic projection.

Referring to the drawings, 1 denotes a primitive element constituted by way of example by a torus-shaped segment semi-cylindrical in section of which the convex face is made specular. The incident rays MNOPQ situated in the plane passing through the middle axis of the specular surface are reflected in the rays M'N'O'P'Q'; a linear reflection is thus obtained which by the movement of the reflecting element is transformed into a luminous surface of a brilliancy but slightly less than that of the source of light. Considering the incident rays LRTS situated in the cross plane it will be seen that these are reflected into the diverging rays L'R'T'S'; this gives a field of vision having a considerable vertical angle and a horizontal angle sufficient for an observer or a row of observers distributed over the field of vision.

By suitably determining the degree of incidence of each element, it is possible to obtain fields of vision placed side by side in the desired manner, which permits the observers to move laterally without any discontinuity occurring in vision. There are two methods available for obtaining the correct degree of incidence. According to the method shown in Figures 3 to 6, the primitive specular element shown in Figures 1 and 2 is subdivided into a plurality of sections by transverse cuts. In the example shown, the element 1 is divided into four portion $a\ b\ c\ d$; the centers of said four portions are brought on the same straight line 2 as shown in the right half of Figure 3. The adjacent elements thus subdivided are staggered with respect to one another, as shown in Fig. 4 and the corresponding sections are finally grouped on one holder, which may be a bar, as shown in Fig. 5.

Figure 3 is a perspective view of an element constituted by three sections 3, 4 and 5 in stepwise arrangement and formed in the above described manner. On account of their curvature along two different radii all the elements transform the incident light into elongated strip-shaped reflexes. By reason of the difference in inclination of the reflecting surfaces, these reflexes are laterally staggered to one another. The same effect is obtained by composing the screen with identical elements having, for instance, the form shown in Figure 1, in the manner denoted by Figure 8. In this case the individual rows include the integral elements $a, b, c, d, e, f, g, h, i, l$, respectively. The elements of two succeeding rows are laterally staggered to one another so that only the elements of a row following that of the row $l$ are again aligned with the elements $a$. The group of rows from $a$ to $l$ inclusive are referred to hereinafter as a "cycle" of rows.

It will be obvious that also within such a cycle the reflexes are laterally staggered to one another.

In both cases the translational movement of the screen is effected in the direction in which the elements or parts thereof have a smaller radius of curvature. Translation may be continuous or oscillatory.

According to Figure 9, the elements obtained preferably from thin sheet metal with a reflecting specular surface are secured to bars 6 of which the ends are mounted on endless chains 7 passing over rollers 8 by means of which the screen is imparted a rapid continuous translational movement.

The screen according to this invention is thus obtained and its useful projection frame is indicated by lines 9. As will be seen from Fig. 9, the elements 6 are spaced from one another to leave gaps 10 constituting the infrascopic spaces; 11 denotes the infrascopic chamber.

The sections or segments $a$—$b$—$c$—$d$ may be grouped into one panel, as shown in Figure 7. The reflecting surfaces 30 have their middle points 31 arranged on the compensating curve 32, of which 33 is the center. The centers of the individual reflecting surfaces are situated on an arc of a circle 34 concentrical to the compensating curve, and the beams passing through the middle points intersect one another in the center 33 of the compensating curve.

The object of this compensating curve 32, of which the radius is greater than the larger radius of curvature of the reflecting elements, is to enlarge the horizontal field of vision.

The above described screen gives an image reproducing with great faithfulness all the polychromatic range of the subject with a considerable brilliancy and contrast. By employing diascopic material and usual moving picture films it is possible to obtain a relief effect (parastereoscopy) which, though still differing from actual stereoscopy, is already quite remarkable.

The screens permits the three-dimensional episcopic projection in colours with one objective, for, the screen acting in this case as a common plane mirror, the observers actually perceive the colours, characteristic aspect and the two stereoscopic perspectives directly in the projected subject. This method of projection may be usefully employed in the study of bacteria, textile fibers, etc.

The chief use of the screen according to this application is in conjunction with both monochromatic and polychromatic stereoscopy and stereo-kinematography.

This, however, requires the use of diapositives or films taken by stereoscopic photography and superposition of the stereos by means of binocular objectives or their equivalent. The screen according to this invention gives directly the "stereoscopic superposition" for all points of vision, thus making the use of binocular objectives and similar means superfluous. The screen may therefore be defined a polyfocal concave mirror, for it multiplies for an infinite number of points of vision the stereoscopic superposition which the normal concave mirror gives for one point of vision only.

The "infrascopic property", namely the possibility of seeing the subjects situated in the chamber 11 during motion of the screen, may be utilized for novel and important uses to which applicants refer as "volumetric infrascopy" (Fig. 9) and "chromatic infrascopy" (Fig. 10).

In volumetric infrascopy suitable sceneries are arranged in the infrascopic chamber, these sceneries being painted on a canvas 12 which is wound on reels 13, affording the possibility of varying the scenery at will, or the scenery may be a natural one. By projecting on the screen the kinematographic action taken on an inactinic background, the observer perceives both action and scenery at the same time with a special dimensional effect. This gives the possibility of showing an action in any desired scenery which was nonexistent at the time as which the kinematographic record was taken. Similarly, a background scenery placed in the infrascopic chamber 11, an intermediate variable scenery projected on the screen and, finally, actors acting on a stage placed in the foreground form a kino-theatrical ensemble which may lend itself to great developments.

Chromatic infrascopy (Fig. 10) is obtained by applying behind the canvas 12 representing the scenery an endless web transparency 14 wound upon reels 15 and colored by gradations in all the colours of the spectrum, one or more projectors 16 being arranged behind said canvas 14. By unrolling the coloured canvas during projection the colour of the projected image is modified. It is thus possible to obtain attractive pseudo-bichromatic effects from the projection of monochromatic photograms with continuous variations produced from the operator's cabin.

Chromatic infrascopy may also be utilized to obtain the apparent vanishment or infrascopic absorption of backgrounds or part of dark images, in non-three dimensional projections thus obtaining, so to say, an "apparent coloured suspension" of the projected subject.

The infrascopic chamber is not strictly necessary in scientific, didactic and advertising projections; in these cases the screen may be considerably simplified, as shown in Figures 11 and 12, in which it has the form of a rotating disc 17 made of sheet metal on which the elements 18 are obtained by stamping.

Another important use of the infrascopic chamber is the one referred to by applicants as "interior projection" or "transcopy". In this case the screen runs over pairs of guide rollers 19 and 20 forming a large infrascopic chamber 21, in which the projector 22 is arranged leaving a sufficient space to insure a projection frame 23 of normal size. To make the projection visible to observers facing the screen the elements 24 (Fig. 14) are inclined through 45° with respect to the projection plane and are coupled with plane specular surfaces 25. The beam of rays KPE issuing from the projector 2 falls upon the elements 24 by which it is reflected in every direction, e. g. in R, R', Z through the specular surfaces 25.

In Figure 14 PE and PK are the rays emitted by the projector under the maximum angle; the issuing rays R and Z show the vertical useful field of vision for all the observers. To prevent direct vision of the objective of the projector sections 27 are disposed in the infrascopic spaces 26.

An apparatus for stereophotoscopic day-light projections is thus obtained in which all the mechanisms are grouped in one cabin, a wall of which serves also for the projections; this apparatus is more particularly useful for ambulant kinematography, amateurs and advertising.

The stereopolyphotoscopic screen according to this invention may be usefully employed for purposes other than those described above and may be varied in its constructional details according to practical requirements without departing from the spirit of this invention.

What we claim is:

1. Screen for three-dimensional projections free to be displaced substantially in the plane of the projecting surface and comprising elements having curved specular surfaces arranged in rows transverse to the direction of displacement, which surfaces have in the direction of displacement relatively small radii of curvature, while in a direction transverse to displacement their radii of curvature are relatively large, the specular surfaces of each pair of succeeding rows being staggered to one another so that within a certain number of rows the strip-shaped reflexes obtained on said surfaces are laterally staggered to one another and during translation of the screen they displace themselves along paths which laterally merge in one another.

2. Screen for three-dimensional projections free to be displaced substantially in the plane of the projecting surface and comprising elements having curved specular surfaces arranged in rows transverse to the direction of displacement, which surfaces have in the direction of displacement relatively small radii of curvature, while in a direction transverse to the displacement their radii of curvature are relatively large, the specular surfaces of each pair of succeeding rows being laterally staggered to one another in a direction transverse to the direction of displacement so that the strip-shaped reflexes obtained on said surfaces during translation of the screen assume paths which within a certain number of rows laterally merge in one another.

3. Screen for three-dimensional projections free to be displaced substantially in the plane of the projecting surface and comprising elements having curved specular surfaces arranged in rows transverse to the direction of displacement, which surfaces have in the direction of displacement relatively small radii of curvature, while in a direction transversely of the displacement their radii of curvature are relatively large, the specular surfaces of each pair of succeeding rows being differently inclined with respect to the projecting surface so that, within a certain number of rows, the strip-shaped reflexes on said specular surfaces being laterally staggered to one another and displace themselves during translation of the screen along paths which laterally merge in one another.

4. Screen as claimed in claim 1, in which the centers of the specular surfaces of the individual rows lie on an arc of which the plane is normal to the plane and direction of displacement and of which the radius of curvature is greater than the radii of curvature of the specular surfaces.

5. Screen as claimed in claim 1, in which the centers of the specular surfaces of the individual rows lie on an arc of a circle, of which the plane is normal to the plane and direction of displacement, and of which the radius of curvature is greater than the radii of curvature of the specular surfaces, and of which the center lies in the point to which the main optical axes of all the specular surfaces of the respective row converge.

6. Screen for three-dimensional projections comprising endless chains, revolving drums for driving said chains, elements having curved specular surfaces mounted on the chains and arranged in rows substantially parallel to the axes of said drums, said surfaces of which those situated on a branch of the chains form the projection field, having a direction parallel to the axes of relatively large radius of curvature, while in a direction transverse to said axes their curvature is of relatively small radius, the specular surfaces of each pair of succeeding rows being staggered to one another so that, within a certain number of rows, the strip-shaped reflexes obtained on said specular surfaces are laterally staggered to one another and during translation of the screen they displace themselves along paths which laterally merge in one another.

7. Screen for three-dimensional projections comprising endless chains, revolving drums for driving said endless chains, a plurality of elements having curved reflecting surfaces arranged in rows transverse to the chains and spaced from one another, said specular surfaces, of which those situated on a branch of the chains form the projection field, having in the direction of the chains curvatures of relatively small radius, while in a direction transverse to the chains their radii of curvature are relatively large, and comprising further a transparent endless web arranged behind said projection field and in the space formed between the two branches of the chain and said drums, on which web sceneries are painted, a second transparent coloured web behind the first endless web and a source of light behind the second endless web to light the first and second webs.

8. Screen for three-dimensional projections comprising in combination a disc rotatable on its axis, a sector of said disc forming the projection field, elements mounted on said disc and arranged in radial rows with respect to the axis of rotation of the disc, which elements have curved specular surfaces having in a radial direction curvature of relatively large radius and a tangential or normal direction a curvature of relatively small radius, the specular surfaces of each pair of succeeding rows being staggered to one another so that, within a certain number of rows, the strip-shaped reflexes obtained on said specular elements are radially staggered to one another and during translation of the screen they displace themselves along distinct paths concentric and adjacent to one another.

9. Screen for three-dimensional projections, comprising a holder free to be rotated in a plane substantially parallel to the plane of the projection surface, elements mounted in spaced relationship on said holder and having curved specular surfaces inclined through 45° with respect to the projection surface, a projector arranged behind the specular elements and mirrors adapted to reflect the rays from said projector through the spaces between the elements on the specular surfaces of said elements.

10. Screen for three-dimensional projections, comprising a holder free to be displaced in a plane substantially parallel to the plane of the projection surface, elements mounted in spaced relationship on said holder and having specular surfaces which are curved and inclined through 45° with respect to the projection surface, a projector arranged behind the specular elements and mirrors adapted to reflect the rays from said projector through the spaces between the elements on the specular surfaces of said elements and masks in said spaces adapted to prevent direct vision on the projector through said spaces from the side opposite the projector.

11. Screen for three-dimensional projections comprising a support free to be displaced in a plane substantially parallel to and coinciding with the plane of the projection surface, elements mounted in spaced relationship on said holder and having curved specular surfaces adapted to form strip-shaped reflexes and inclined through 45° with respect to the projection surface, a projector arranged behind the specular elements and mirrors adapted to reflect the rays from said projector through the spaces between the elements on the specular surfaces of said elements.

ARTURO MARTINEZ.
MATTEO MARTINEZ.
ANGELO MARTINEZ.